United States Patent
Schuster (10) Patent No.: US 6,655,520 B2
(45) Date of Patent: Dec. 2, 2003

(54) BRAKE DRIVE (75) Inventor: Wilhelm Schuster, Linz (AT)

(73) Assignee: Shukra-Geratebau A.G., Leonding (AT)

( * ) Notice: Subject to any disclaimer, the term of this patent is extended or adjusted under 35 U.S.C. 154(b) by 0 days.

(21) Appl. No.: 09/802,516

(22) Filed: Mar. 9, 2001

(65) Prior Publication Data

US 2001/0042670 A1 Nov. 22, 2001

Related U.S. Application Data (63) Continuation of application No. PCT/EP99/06747, filed on Sep. 13, 1999.

(30) Foreign Application Priority Data

Sep. 11, 1998 (AT) ............................................... 1537/98

(51) Int. Cl.[7] ............................................. F16D 67/00
(52) U.S. Cl. ............................. 192/223; 192/75; 188/83
(58) Field of Search ............................. 192/223, 223.4, 192/75; 188/83

(56) References Cited

U.S. PATENT DOCUMENTS

| 905,912 A | * | 12/1908 | Nehring | 192/223 |
|---|---|---|---|---|
| 2,845,156 A | * | 7/1958 | Dayton | 139/232 R |
| 3,146,868 A | * | 9/1964 | Lang | 124/16 |
| 3,307,663 A | * | 3/1967 | Luenberger | 188/134 |
| 3,447,643 A | | 6/1969 | Ulbing | |
| 3,722,641 A | * | 3/1973 | Kusiak | 192/223 |
| 4,591,029 A | | 5/1986 | Da Foe | |
| 4,742,896 A | | 5/1988 | Granbom | |
| 5,007,511 A | | 4/1991 | Ostrander | 192/8 R |
| 5,779,383 A | * | 7/1998 | McCallum | 188/83 |

FOREIGN PATENT DOCUMENTS

| FR | 74 27654 | 8/1974 | F16D/41/20 |
|---|---|---|---|
| GB | 1287966 | 6/1970 | F16D/41/20 |

* cited by examiner

*Primary Examiner*—Christopher P. Schwartz
*Assistant Examiner*—Xuan Lan Nguyen
(74) *Attorney, Agent, or Firm*—Grant D. Kang, Esq.; Robert C. Haldiman, Esq.; Husch & Eppenberger, LLC

(57) ABSTRACT

A braking drive for a control cable or shaft has a drive shaft with a radial journal. A contractible brake ring has opposing ends defining a gap, with the journal in the gap The ring has an exterior surface biased outwards and two interior detents. A stationary interior housing circumscribes the ring, with an interior surface in frictional contact with the ring. An exterior portion of the housing has bosses being disposed within the detents of the ring.
Friction between the ring and the housing interior arrests rotation of the journal and drive shaft until a force on the exterior portion of the housing moves the bosses, transferring the force to the ring via the detents, whereby the ring is contracted, releasing the frictional brake between the housing and the ring, thereby allowing rotation of the drive shaft.

15 Claims, 5 Drawing Sheets

BRAKE DRIVE

CROSS REFERENCE TO RELATED APPLICATIONS

The present application, Ser. No. 09/802,516 filed on Mar. 9, 2001, claims priority under 35 USC §119 and §365 (c) to application PCT/EP99/06747, filed Sep. 13, 1999, which claims priority to Austrian patent application No. A1537/98 filed Sep. 11, 1998.

BACKGROUND OF THE INVENTION

The invention relates to brake drives (reverse brakes) which can be employed in many engineering sectors, for example as adjusting and fixing devices in machines, medical instruments and equipment, sports and household devices, control mechanisms, for chairs and other items of furniture, in vehicles, aeroplanes, car seats etc. These brake drives can be actuated by both a hand wheel 6 and by a control lever (6a in FIG. 5) or by electrical, pneumatic, hydraulic or any other switching or control elements which are not shown.

The object of the invention is to create brake drives which can be designed in a simple and cost-effective manner owing to their construction and optimal brake pressure distribution, and can also be designed in plastics material, zinc injection moulding or aluminium injection moulding, i.e. from less rigid material (parts 1 to 6a) and can be adjusted and fixed by both a hand wheel (6) and by a control lever (6a in FIG. 5) or by electric, pneumatic, hydraulic, magnetic or any other switching or control elements (not shown) from the primary or drive side "by entraining the drive side, for example shaft 3" in both directions, in other words against a blocking or braking force, with the smallest amount of slippage between primary rotational movement (adjustment or actuation) and secondary reverse locking or movement, for example at a drive or driven shaft 3. A forward or reverse movement, each rotational movement of the drive and driven shafts can be severely braked or completely blocked and released again as quickly as desired and at any time depending on the design and adjustment. The disadvantages or weaknesses of brake drives and overrunning-type brakes according to the current state of the art are avoided by the subject of the invention.

Up until now, brake drives had inter alia multi-threaded cylindrical helical springs as braking element, which springs gradually expand along a stationary drum cylinder from one spring winding to the next owing to circular pressure (for example anticlockwise) on one of the two spring ends in a stationary drum cylinder until all windings are gradually jammed against the stationary drum and block further rotation in the same direction. Owing to a circular tensile force at the other end of the same brake spring (understandably only with slippage with respect to the preceding circular force of pressure at the other spring end), the individual spring windings can gradually be spooled onto a smaller cylindrical external diameter of the spring and jamming or blocking against rotation of the spring and therefore of a potential drive shaft are gradually cancelled only with an undesirable slippage path.

This dead rotational slippage between releasing, rotating and blocking in previous reverse brakes constitutes a big disadvantage compared with the present "Brake drive" invention.

A further disadvantage of these multiple springs is that only a very thin, circular, external line of the individual helical spring windings, in other words a very small face, is supported on the housing inner cylinder, as a result of which, a high rigidity material such as steel or the like must be used as a spring and also for the brake drum (as a large specific force has to be exerted by the mini-friction face of the spring onto the cylindrical friction face).

A further significant disadvantage is that "a large amount" of unused space and unused cylindrical friction face of the housing, in other words unused brake drum face between the thin actual spring friction faces, is wasted between the very thin, helical friction faces of each individual helical spring winding supported tangentially on the brake cylinder.

The hitherto conventional overrunning roller-type or overrunning ball-type brakes require a similar waste of space and unnecessarily require an extremely high level of material rigidity (and are therefore generally made of steel and with expensive, and the highest levels of precision), which brake types all operate only with point application in terms of material even when the largest braking or blocking force is desired.

Shoe brakes have the disadvantage inter alia that their cylindrical friction faces are constantly rigid in diameter and in the curvature with the housing internal cylinder curvature do not achieve a really saturated specific force of pressure applied uniformly to the entire brake periphery or cannot guarantee this over a prolonged period of time. For this reason, nearly all shoe brakes must comprise an additional compressible material (the brake linings) between the shoe brake face and the drum inner cylinder brake face which also has to be replaced with prolonged use.

SUMMARY OF THE INVENTION

Advantageous embodiments of the present "Brake drive" invention are provided in the patent claims and sub-claims and the drawings and, in brief, provide the following advantages:

1. Both "active" brake cylinder faces 5 are many times larger because they rest on one another "with their entire faces" without unused intermediate spaces and therefore can be used 100%.

2. As a result, the specific surface pressure (per $mm^2$) is so small that even plastics material, aluminium, zinc or other injection moulded materials or less rigid materials and more favourable production methods can be used for the active elements.

3. The expanding ring 2 has no no-load operation (slippage) between blocking and releasing because (like a helical spring) it does not have to wind or unwind over a plurality of spring windings when it receives a circular push at a brake cylinder end of the expanding ring to radially enlarge the diameter or the brake force and inversely, receives circular tensile force at the other pitch circle end of the brake cylinder once to reduce the expanding ring diameter and therefore to lift the brake in order to be able to adjust the brake drive.

4. The entire one-piece expanding ring (see FIG. 1) can also be designed as a double ring as in FIG. 3 and with and without additional expansion springs (9, 9', 9", see FIG. 2) and can also be of multi-layered laminated design and despite this retains all the advantages of the new brake drive.

5. The expanding ring 2 which, with its larger external cylinder diameter, was squeezed upon installation into the smaller internal cylinder of the brake drum 1, has (in contrast to rigid shoe brakes) the active snap force (expansion force) at all points of its friction cylinder periphery, in addition to the normal application force, to convert itself from a smaller radius into a larger radius by means of its inherent tendency and its stored force.

Owing to the previously mentioned advantages alone, the brake drives according to the present invention rarely have any undesired slippage between control and blocking or braking any more, and this is in both primary and secondary terms, in other words at the input and at the output side.

6. Further advantages are given by an additional increase in the brake force of the brake drive inter alia by, for example:
   a) keyway-shaped inner and outer faces between expanding ring and housing (transverse to the cylinder face, see FIG. 4 on the brake faces 5) as a result of which an additional snap and braking effect or blockage is produced by the tapered rings in the opposing keyways at the entire periphery, as is the case with a V-belt.
   b) Owing to symmetrical or asymmetrical micro or normal waviness of one or both friction faces, in longitudinal direction or direction of rotation of the circular brake faces (see FIG. 3, circular pictures a and b), a complete standstill against a rotation is achieved between drum 1 and expanding ring 2 with the slightest expansion, and running is again achieved with slight compression of the expanding ring.
   c) Owing to such a symmetrical or asymmetrical micro- or macro-waviness of one or both friction surfaces, or micro- or macro-waviness extending in another way, an ideal state can be achieved for many purposes, for example, in such a way that the brake drive itself (in other words, without but also with "counter-torque") has a larger braking moment, for example in the anticlockwise direction (or clockwise direction) than in the other direction of rotation. As a result, the torque for lifting a crane load, for example, can be designed so as to be smaller than that for rewinding the cable pull or other drive. The reverse movement is actually more sluggish than the lifting or tensioning process of, for example, a cable pull or other drive. This can also be achieved, for example, by an asymmetric sine curve or the like which is gentler in direction of rotation, in other words flatter, and is steeper in the reverse direction and therefore has more braking power.
   d) When the direction of rotation in which the brake drive should brake or block is known, a starting aid can be provided at that end of the expanding ring friction face which is remote from the pressure point of the driving journal 4 on the circular end face of the ring 2 and which is not pushed by the part 4 itself, for the start of braking after a lifting process, in other words a braking aid for the transition from the lifted expanding ring position to the expanded, braked or blocked position (similar to a trimmer in ships, aeroplanes, etc.), by start braking aids (see FIG. 3, parts 12 and 12*a*).

Figures 3, 4:
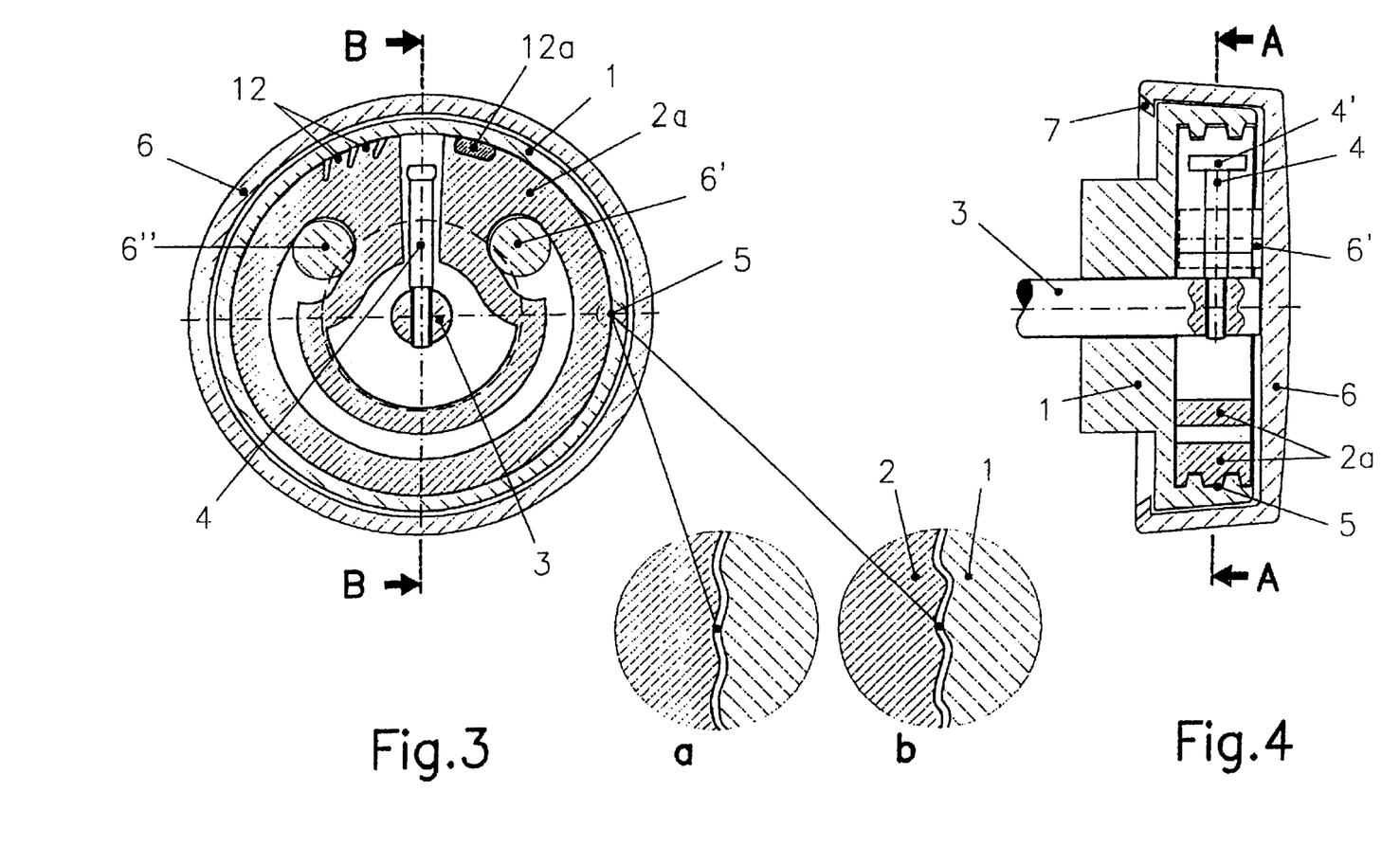
FIG. 3 is a cutaway front view of yet another embodiment of the brake drive.
FIG. 4 is a cutaway side view of yet another embodiment of the brake drive.

The parts 12 are ribs which project slightly beyond the brake cylinder of the expanding ring 2 which, after lifting in the event of a further braking or blocking wish, start to brake as first parts of the expanding ring 2 owing to their early contacting of the brake drum inner cylinder 5 (and also owing to their additional tilting). As a result, the remaining arc of the circle and brake face are brought more quickly and violently into close contact and the entire ring is expanded or blocked as in a chain reaction.

The start braking aids 12*a* operate in a similar manner. They comprise one or more additionally inserted or vulcanised-on, glued, dipped coatings with materials which project slightly and have a higher coefficient of friction.

7. An expansion element (see FIG. 6*b*) which has been produced from slightly resilient material and has also been squeezed, with excessive diameter into the brake drum 1 and can only receive counter-torques in "one" direction of rotation, can be rotated in both directions by a pivoted lever 6*a* (in other words, also against the block) when owing to actuation of the lever or a pulled-on hand wheel etc., a shrink ring 13 can be reduced in diameter until the resilient expansion element 2*b* with its segment indentations 14 is reduced in diameter by the shrink ring 13, which is cast or located in a groove, until it is loosened or lifted such that the pivoted lever 6*a* together with the expansion element 2*b* can rotate in the stationary brake drum 1 which in turn then drives the driven shaft 3.

8. To increase the expansion force of the expanding rings 2, expansion force intensifiers can be used (parts 10 in FIGS. 5, 5*a* and 5*b*) which intensify the braking or blocking force of the expanding ring owing to the counter-torque of the driven shaft 3. Owing to, for example, contracting elements, such as the two contracting journals 6' and 6", which, for example, are securely connected to a contracting pivoted lever 6*a* or are integral therewith, both the expanding ring 2 and the expansion force intensification lever 10 or expansion force intensification eccentric 10' and the shaft 3 can be reversed, a contracting clearance 11 (play between brake internal and external cylinder) can be created and the rotational position of the shaft 3 can also be adjusted and fixed again in both directions of rotation by means of its driving journals 4 with the same pivoted lever 6*a* or instead of that, a pulled-on pivoted hand wheel (with the same contracting journals 6' and 6").

9. The secondary reverse torque presses in a circular manner exclusively on the inner end face of the expanding ring 2 via the shaft 3 and its driving journals 4 in such a way that it can only exert a torque on the expanding ring on the end face of the expanding ring ends in a radially-pushing manner. Owing to the actuating element or elements, this power arm lever can be used to adjust a brake drive and to restrain a circular force, in other words for braking or blocking a torque or rotating a shaft.

The brake drive is installed as an embodiment in FIG. 1 to FIG. 4 in the free interior of a conventionally hollow hand wheel (part 6) which can also be mounted, for example, for actuating or adjusting a car or office seat or any machine or any device, or with which a torque force automatically braked or blocked against reverse movement or rewinding is to be controlled.

Such a hand wheel (part 6) or such an adjusting lever (part 6*a* in FIG. 5) or even just the brake drive alone (with or without other actuation elements) can be adjusted in both directions of rotation with driving of the shaft (part 3) without additional lifting of a brake or overrunning or other type of brake or blocking device. When the hand wheel or the lever or actuating element for the brake drive is released, the brake drive brakes or blocks automatically, in other words (depending on the adjustment and/or design, pretensioning, material use etc.) the brake drive cannot reverse the adjusted rotational movement in a secondary retroactive manner or can only do this in a severely braked fashion, from the driven shaft 3, after an adjusting force has been released after a primary adjustment (by the hand wheel, the lever etc.).

The brake drive can, however, also be located inside any design at any point of a drive shaft or driven shaft (supported against external torque by the environment or a cable pull, a spoke or other anchorage) in such a way that the primary adjusting rotary force acts (primarily, in other words in an adjusting fashion), for example, by means of a second hollow shaft (not shown) (pulled over a projection of the first shaft 3) acting on the same axis or an adjusting shaft extending in an articulated manner at an angle to the main axis, but equally for example, by means of a cable reel and Bowden wires, toothed wheel or other drive mechanisms inside a device, equipment, furniture, vehicle etc., wherein the driving or driven outgoing shaft 3 can be adjusted with the primary adjustment. Inversely, in other words secondarily, this shaft 3 cannot, however, (or, depending on adjustment, with greater or less ease) rotate this brake drive.

DESCRIPTION OF DRAWINGS

Figure 1:
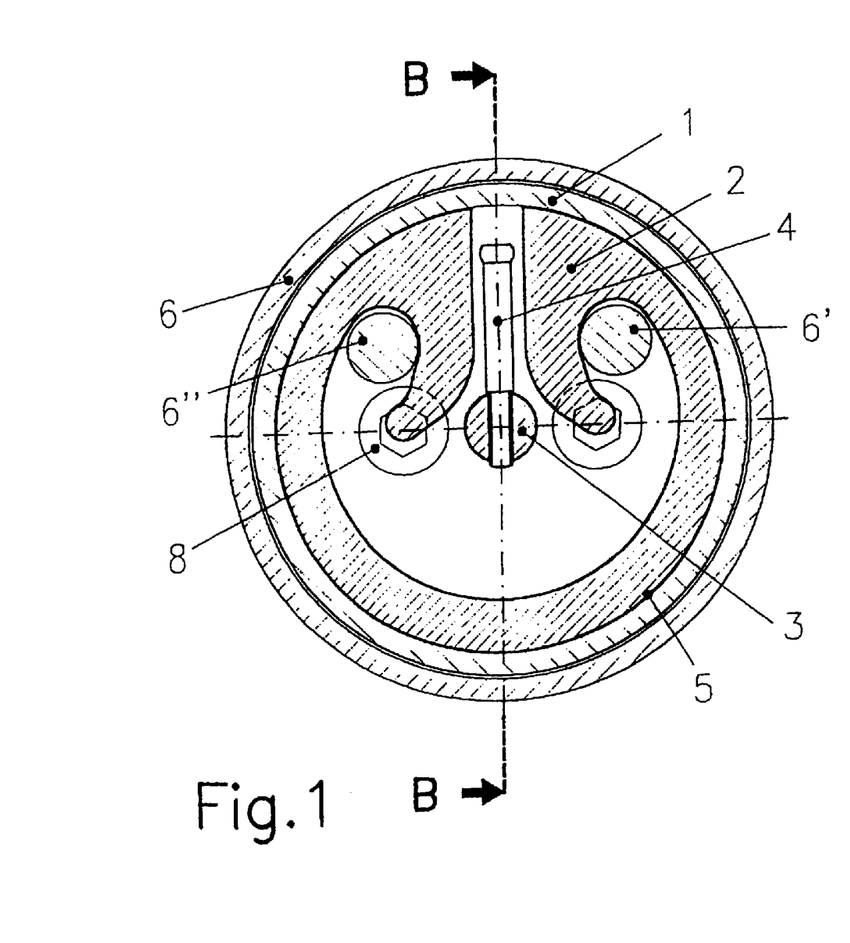
FIG. 1 is a cutaway front view of the brake drive.
Figure 1A:
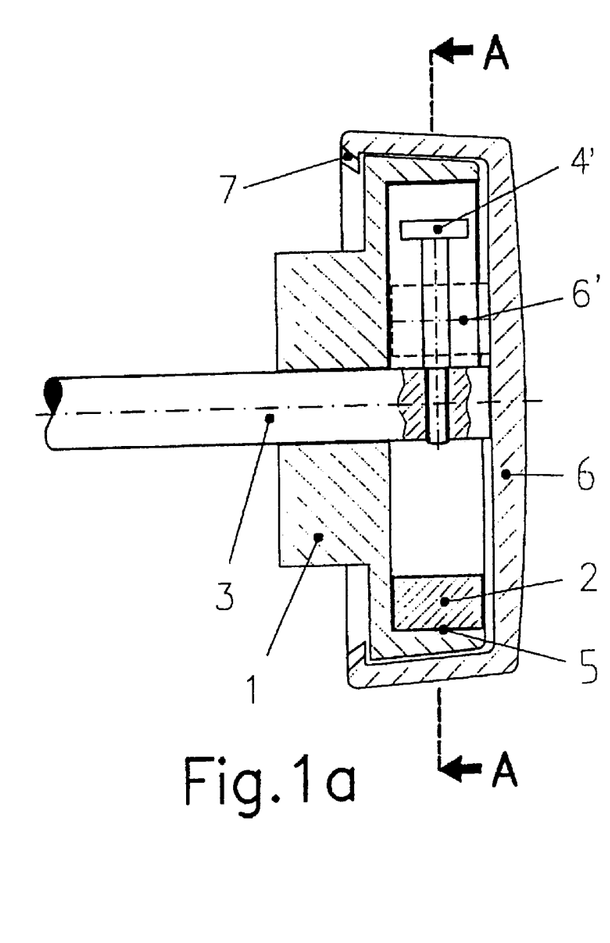
FIG. 1A is a cutaway side view of the brake drive.

FIG. 1 shows in section A—A through FIG. 1*a* a housing 1 with cylindrical inner face which serves as friction (or braking) face 5 and receives the open single expanding ring 2 which has its cylindrical friction surface 5 on the outer side. The predetermined external diameter of the expanding ring 2 has a larger external diameter in the uninstalled state than the cylindrical inner friction face 5 of the housing 1. After installation of the expanding ring 2 by compressing (pretensioning) and insertion into the housing 1, the friction faces 5 of the two components 1 and 2 press firmly against one another, as a result of which the braking effect against rotation of the expanding ring 2 is actually achieved in the stationary housing 1. A permanent torque which retroacts, for example by a mechanism which can be adjusted by means of the shaft 3, is, however, additionally braked until stopped in every position of the expanding ring 2 by the driving journal 4. The driving journal 4 presses, namely with its support part 4', in a circular and non-positive fitting manner on the radial end face of the open expanding ring 2 and therefore further intensifies its predetermined, inherent braking torque or the braking effect between expanding ring 2 and housing 1. This braking force or blocking is, however, weakened or cancelled by rotating the hand wheel 6 (with its contracting journals 6', 6" which are formed as one piece with the hand wheel or are mounted). These journals exert a circular tensile force on the other open end of the expanding ring 2 which reduces or cancels the snap and braking force of the expanding ring 2. The hand wheel 6 can then cancel the blockage or braking effect in the reverse sequence via the expanding ring 2, the application part 4', the driving journal 4 and the shaft 3 and allows the entire mechanism, i.e. the brake drive, rotation and adjustment in both directions of rotation (also against a blockage).

FIG. 1*a* shows section B—B through the centre of FIG. 1. The circular pull hand wheel is pulled over the housing 1 and secured against removal by moulded-on catching lugs 7.

Figure 2:
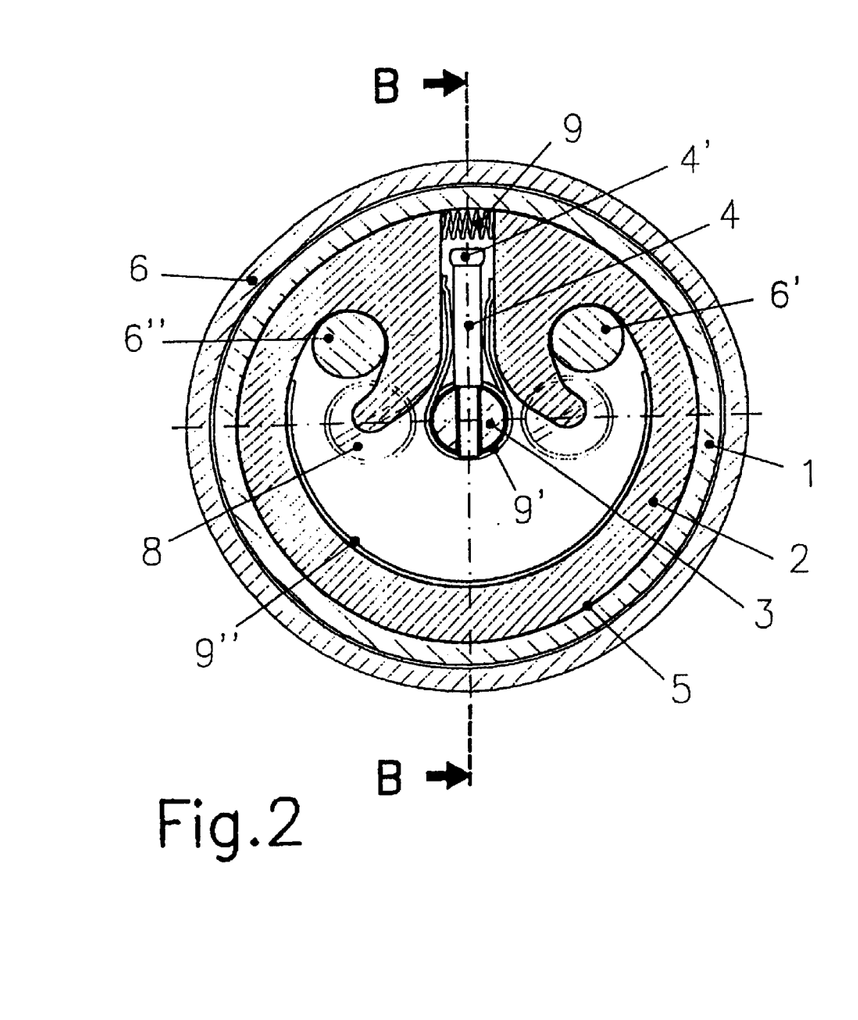
FIG. 2 is a cutaway front view of another embodiment of the brake drive.
Figure 2A:
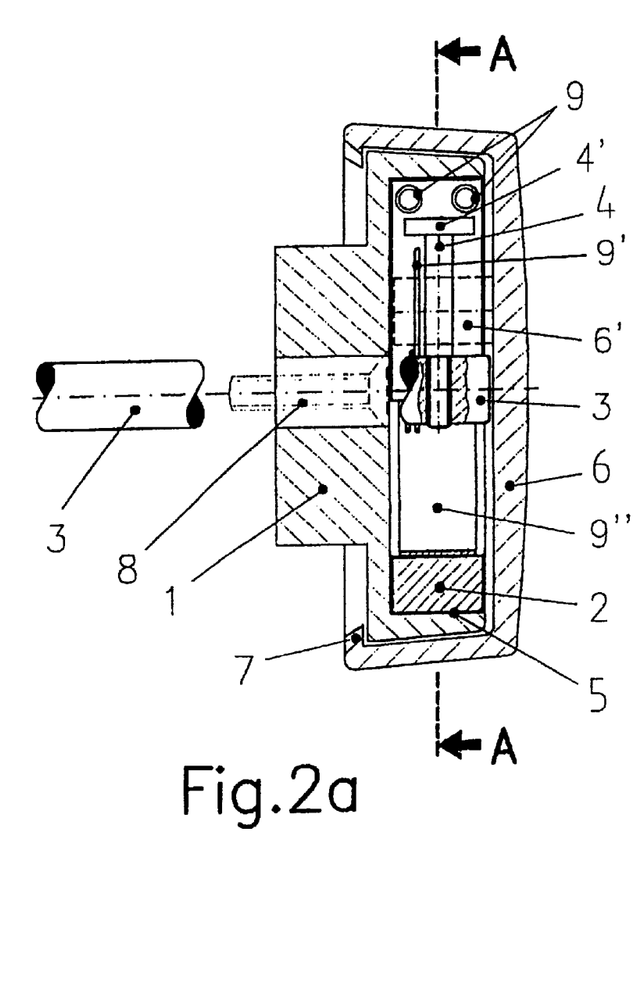
FIG. 2A is a cutaway side view of another embodiment of the brake drive.

FIG. 2 and FIG. 2*a* show a brake drive as it is described in FIG. 1 and FIG. 1*a*, however, the inherent expansion force of the expanding ring 2 is intensified by additional expansion elements, such as the springs 9, 9', 9" shown for example, which simultaneously increase the braking effect. Three variations of expansion elements are shown by way of example: 1.) The two helical springs 9 are located between the two radial end faces of the aperture of the expanding ring 2. 2.) A double-threaded helical spring 9', which is wound round the shaft 3 and the ends of which are extended, also presses with these ends against the two end faces of the expanding ring 2. 3.) A spring strip 9" which is bent round with pretensioning and is inserted on the inside of the expanding ring 2. An embodiment which is not shown would be, for example, an expanding material such as a rubber, foam material, a plastics material, an insulating air cushion, pneumatic springs etc. which can be inserted into the expanding ring to increase the expansion force.

An example of a method of securing the entire brake drive through the base of the housing 1 with countersunk head screws 8 is also shown in FIG. 2*a*, wherein the view of the shaft 3 is interrupted.

FIG. 3 shows a further brake drive with a double expanding ring 2, the inner ring of which additionally applies an expansion force to the friction face 5. Two variations of the design of the friction or brake faces 5 are shown by way of example in the detail enlargements a and b. The waviness, by way of example, of the two friction faces 5 can have the same structure or a different structure both on the housing 1 and on the expanding ring 2 and can be microfine or coarse and of different depth. The difference between the two examples is:

Variation a: the wave path is uniformly symmetrical. The same resistance is encountered in both directions of rotation upon braking and adjusting.

Variation b: the wave path is steeper in ascent than descent. Greater resistance is encountered in one direction and less resistance is encountered in the other direction upon braking and adjusting. Therefore, a torque acting permanently or pulsatingly and in retroactive fashion on the brake drive in one direction can be intercepted, moderated, levelled better or, with regard to the adjustment force expenditure, be partially or completely reversed or can also be stopped completely even with lower expansion force.

Owing to the design of the friction faces, the braking effect is intensified in addition to the friction and expansion force, because a further force expenditure is required to overcome the gradient and when each wave is overcome the expanding ring 2 is pretensioned in each case by double the wave height. The fact that owing to the respective "engagement" in each wave trough, the sliding friction is partially to completely converted into a stationary friction and therefore the coefficient of friction is increased towards the start of a reversal, also intensifies the effect.

FIG. 3 also shows braking start aids 12 and 12*a* which are only applied individually and only start expansion of the expanding ring in one direction of rotation after the venting procedure (like a trimmer in ships), when they act on the other expanding ring end face which has not been pushed (owing to slight projection above the brake cylinder or owing to special brake material).

FIG. 4 shows a keyway-shaped, meshing design of the two friction faces 5 on the housing 1 and on the expanding ring 2. On the one hand, this enlarges the friction faces as a whole and, on the other hand, the braking effect owing to the keying of the respective groove with the opposing wedge. The peripheral keyways can also be designed as screw threads for screwing the expanding ring 2 (expansion element) into a nut-like housing 1.

Figure 5:
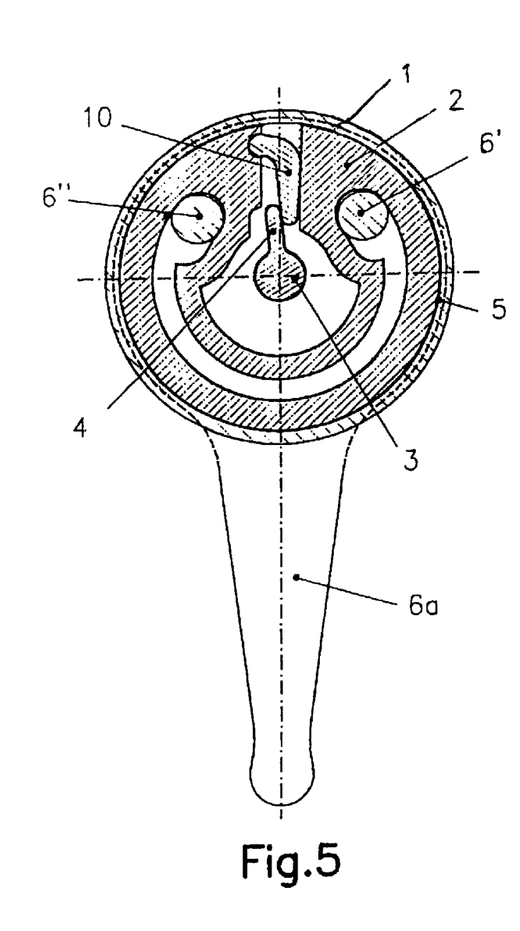
FIG. 5 is a cutaway front view of another embodiment of the brake drive.

FIG. 5 shows a brake drive with double expanding ring 2 and a contracting pivoted lever 6a which comprises two contracting journals 6', 6" integrally or securely connected to the contracting pivoted lever. The shaft 3 has a driver 4 (integral or loose), the end of which engages in the aperture of the expanding ring 2 and transmits a retroactive torque to an expansion lever 10 via the shaft.

This expands the expanding ring 2, in addition to its own inherent expansion force (or else in the absence or relaxation of the same), over the two, for example, radial end faces of the expanding ring 2 inside the housing 1, whereby the braking effect can be increased up to blockage. By pivoting the lever 6a (in either direction of rotation), the double expanding ring 2 is compressed to a smaller external diameter owing to the two contracting journals 6' and 6" fixed in their spacing to one another and to the pivoted lever 6a (for example, by integral design of all three elements) but co-pivoting with the pivoted lever 6a, and as a result, the expansion force and braking force is cancelled such that the pivoted lever always pivots about that contracting journal 6' or 6" as its fulcrum, which is located on the same pivoting direction of the lever.

Figures 5A, 5B, 5C:
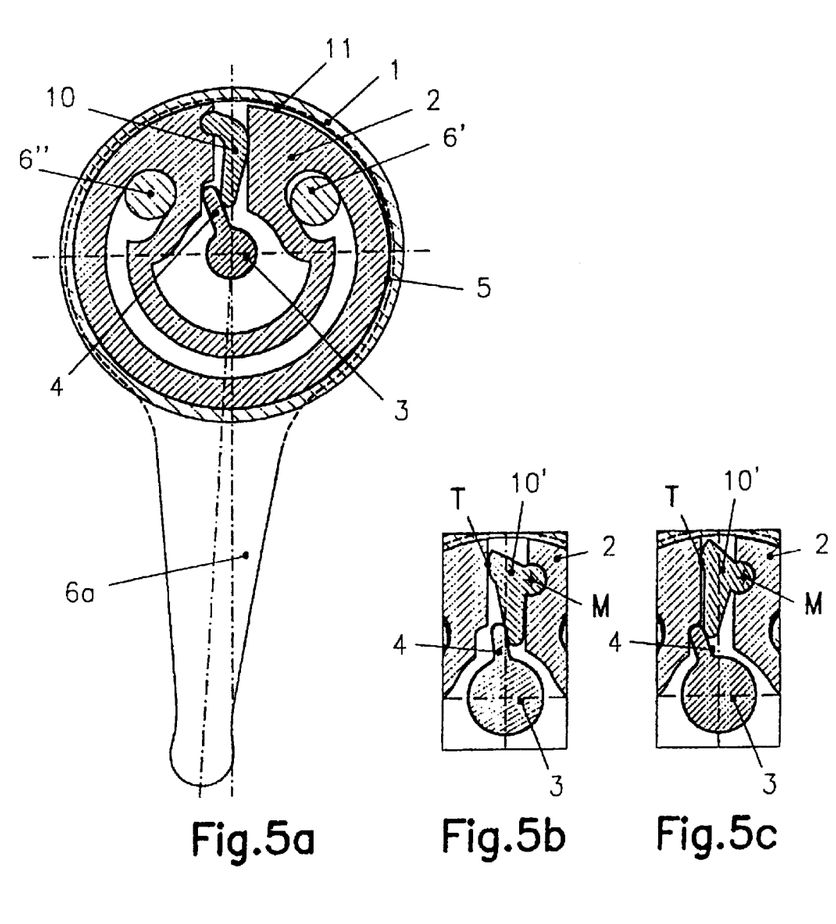
FIG. 5A is a cutaway front view of another embodiment of the brake drive.
FIG. 5B is a cutaway close-up front view of the journal and lever interaction of the brake drive.
FIG. 5C is a cutaway close-up front view of the journal and lever interaction of the brake drive.

FIG. 5a shows the pivoted lever pivoted about the central point and fulcrum of the journal 6". It has driven the opposing contracting journal 6' about the same central point 6". As a result, the entire expanding ring 2 is again compressed (or contracted) (see air gap 11) to a smaller diameter owing to this circular eccentric movement and wedge effect between the two journals 6' and 6" with larger translation through the lever 6a "against inherent and foreign expansion forces". The expansion intensification lever 10 is also reversed by the two inherent end faces of the expanding ring 2 again compressed (together with the driven shaft 3—via its driver 4). The entire brake drive together with the shaft 3 can now be rotated or adjusted towards both sides against or with an available counter-torque on the driven side. When the pivoted lever 6a is released, the expanding ring 2 immediately expands again, intensified or not intensified, for example by an expansion intensification lever 10, and brakes or blocks, depending on construction, design, intention, the materials used etc., a reverse rotation by the driven shaft 3 or a counter-torque.

The pivoted lever 6a can also be designed, as in FIGS. 1 and 1a, 2 and 2a and 3 and 4, without a lever by means of a hand wheel 6 pushed over the entire brake drive when sufficient play is left between the inner cylinder of the hand wheel 6 and the outer cylinder of the housing 1 for slight pivoting about one of the two journals 6' or 6", instead of rotation about the central point.

FIGS. 5b and 5c show, in each case, an expansion intensification lever 10' which can be rotated by its rotary journal part about its fulcrum M when a counter-torque from the driven side presses from the shaft 3 by means of its driving journal 4. The expansion intensification lever in FIG. 5b has, as a result, for example, already rotated the expansion intensifier 10' and its eccentric pitch circle face additionally spreads apart the opposing faces of the same expanding ring 2 at the point of contact of the tangent T and additionally presses the end of the expanding ring 2 with its friction face onto the housing cylinder face with this translation lever 10'. FIG. 5c shows that the expansion intensifier 10' is again reversed about the fulcrum M in the reverse sequence when the expanding ring 2 (as described in FIG. 5a) contracts owing to a translation pivoted lever 6a, i.e. is again compressed to a smaller diameter.

Figure 6:
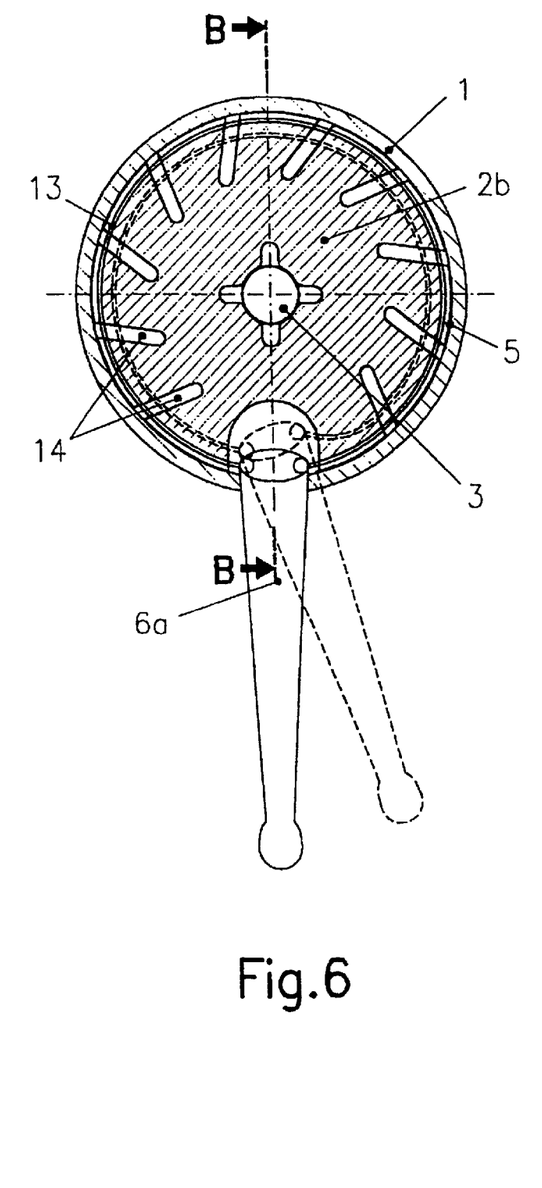
FIG. 6 is a cutaway front view of another embodiment of the brake drive.
Figure 6A:
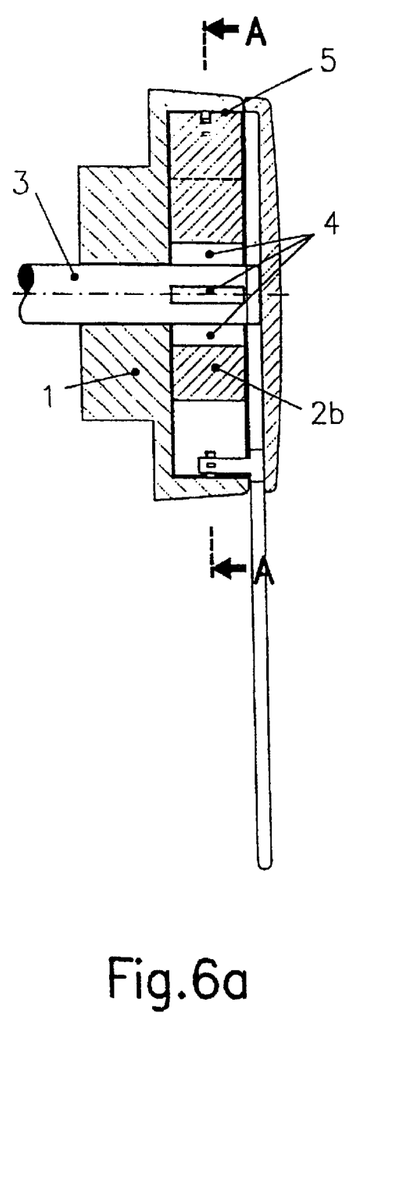
FIG. 6A is cutaway side view of another embodiment of the brake drive.

FIG. 6 and FIG. 6a show an elastic expanding ring 2b made of a slightly resilient material, the outer cylinder of which, as with the previous expanding rings 2 and 2a, is greater in diameter prior to assembly than the internal diameter of the cylinder of the housing 1. After assembly, i.e. after this elastic expansion spring has been pressed into the housing, an "inherent expansion or inherent braking force" is also already produced which is smaller in one direction of rotation and substantially larger in the other direction of rotation. By tilting the intermediate segment portions about their roots upon a counter-torque towards the indentations 14, owing to oblique indentations 14, many individual "tilting expansion braking forces" are again created up to total blockage, in addition to their inherent expansion and braking force. One or more circular shrink rings 13 arranged on or just below the brake cylinder periphery of the elastic expanding ring 2b can reduce their own diameter and the elastic expanding ring diameter by compressing and shortening their circular periphery, for example with the aid of the pivoted lever 6a shown. As a result, the braking or blocking force of the elastic expanding ring 2b is also reduced and an adjustment of the entire brake drive together with the driven shaft 3 anchored in the expanding ring 2b is possible in both directions of rotation and also against the segment portions and blocking force.

What is claimed is:

1. A brake drive comprising:

a drive shaft having a journal extending radially from the longitudinal axis of said drive shaft;

a contractible brake ring having opposing ends defining a gap, said gap being in rotationally driveable communication with said journal of said drive shaft, said contractible brake ring having an exterior surface and having at least one detent disposed within the circumference of said ring and said contractible brake ring having a structural tension biasing said exterior surface outward;

a housing circumscribing said contractible brake ring, said housing having an exterior portion capable of receiving an external force and an interior portion having a surface in frictional contact with said exterior surface of said brake ring, said exterior portion of said housing being moveable independently of said drive shaft and said interior portion of said housing;

said exterior portion housing further having at least one boss fixedly attached to said exterior portion of said housing, said boss being disposed within said at least one detent of said contractible brake ring in contracting cooperation therewith;

whereby friction between said exterior surface of said contractible brake ring and said surface of said interior portion of said housing arrests rotation of said journal of said drive shaft until force on said exterior portion of said housing moves said at least one boss of said housing, said boss transferring the force to said at least one detent of said brake ring, whereby said ring is contracted, said contraction releasing frictional contact between said surface of said interior portion of said housing and said exterior surface of said contractible brake ring, thereby allowing rotation of said drive shaft, the force applied to said exterior portion of said housing being transferred through said at least one boss of said housing, said at least one detent of said contractible brake ring and against said journal of said drive shaft by one of said opposing ends of said contractible brake ring, said movement of said boss being non coaxial with said drive shaft.

2. The brake drive of claim 1 wherein said surface of said interior portion of said housing and said exterior of said contractible brake ring are cylindrical.

3. The brake drive of claim 1 wherein said surface of said interior portion of said housing and said exterior of said contractible brake ring are conical.

4. The brake drive of claim 1 wherein said contractible brake ring is produced at least partially from resilient material.

5. The brake drive of claim 1 further comprising at least one more detent on said contractible brake ring.

6. The brake drive of claim 1 wherein said contractible brake ring is plastic.

7. The brake drive of claim 1 wherein said at least one detent has an arcuate surface contacting said at least one boss.

8. The brake drive of claim 1 wherein said at least one detent presents a cam surface to said at least one boss, said cam surface being disposed such that at least one movement of said at least one boss exerts an inward radial force vector on an end of said contractible brake ring operably associated with said detent.

9. The brake drive of claim 1 wherein said at least one boss maintains contact with said at least one detent when external force is absent.

10. The brake drive of claim 1 wherein said at least one boss maintains contact with said at least one detent when the force is in a direction that does not release said brake drive.

11. The brake drive of claim 1 wherein said movement of said at least one boss is around a fulcrum that is non coaxial with said drive shaft.

12. The brake drive of claim 1 wherein said external portion of said housing is a handwheel.

13. The brake drive of claim 1 wherein movement of said at least one boss is eccentric.

14. The brake drive of claim 1 wherein transfer of external force is through both of said opposing ends of said contractible brake ring.

15. The brake drive of claim 1 wherein a gap is maintained between said internal portion of said housing and said external portion of said housing.

* * * * *